May 6, 1930.  C. E. MAYNARD  1,757,127

TIRE TRIMMER

Filed Aug. 10, 1928

INVENTOR.
CHARLES EDGAR MAYNARD.

BY

ATTORNEY.

Patented May 6, 1930

1,757,127

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

TIRE TRIMMER

Application filed August 10, 1928. Serial No. 298,738.

My invention relates to a device for trimming the edges of tread stock or sidewall strips after this stock has been stitched to a tire carcass.

The purpose of my invention is to provide a device that will accurately and essentially automatically turn the edges of such strips and that may easily and quickly be brought into working position from an inoperative position. Another purpose of my invention is to provide a device that will constantly hold the trimmer against the tire with a yielding pressure. Other purposes will be apparent from the following specification and claims.

Referring to the drawings showing but one embodiment of my invention:

Figure 1:
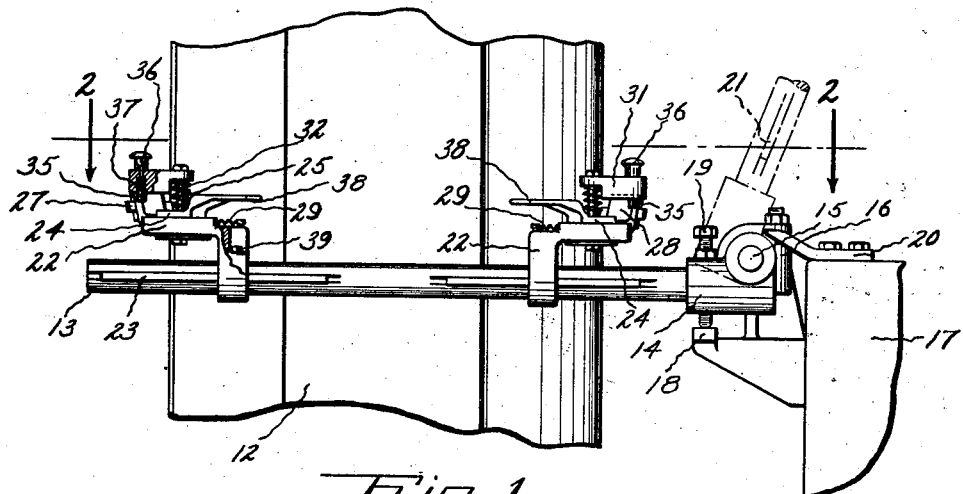
Fig. 1 is a front elevation of the trimmers mounted on the frame of a tire building machine.

In the drawings a tire carcass 10 has been constructed on a tire building drum 11 and a tire tread 12, built in this case as one unit with the sidewall strips, has been located and stitched onto the carcass 10. A pair of trimmers, one for each edge of the drum, are carried by a bar 13 fixed to a member 14 that is pivoted on a shaft 15 carried by a bracket 16 on the housing of a tire building machine 17. A stop 18 co-acting with an adjustable bolt 19 on the member 14 regulates the horizontal position of the bar 13 while a stop plate 20 allows the bar 13, together with the trimmers, to be tilted back into an inoperative position as indicated by the dotted lines 21.

Figure 2:
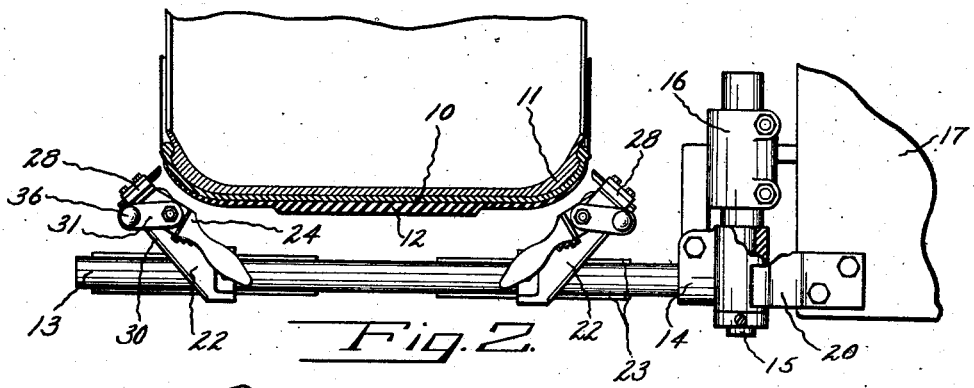
Fig. 2 is a view taken substantially on line 2—2 of Fig. 1.

As the trimmers are similar only one will be described, this description sufficing for both units. The trimmer consists of a support bracket 22 slidably mounted on the bar 13 and prevented from rotation by a pair of keys 23. A knife holder 24 is pivotally held on a stud 25 adjustably fixed in an elongated slot 26 in the bracket 22. A knife blade 27 is clamped onto a projecting portion 28 of the holder 24. A tension spring 29 fixed between a point on the holder 24 and on the bracket 22 tends to keep the holder against a flange 30 on the bracket 22 as shown in Fig. 2.

Figure 3:
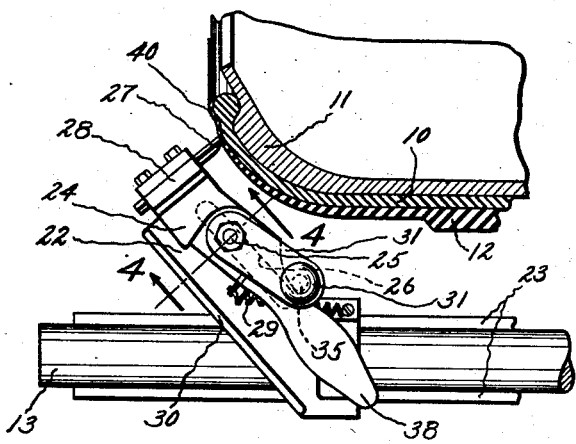
Fig. 3 is an enlarged view of one of the trimmers showing it in trimming position.
Figure 4:
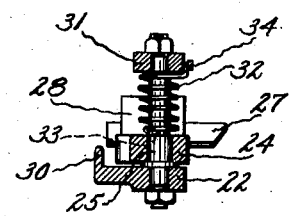
Fig. 4 is a view taken substantially on line 4—4 of Fig. 3.

A link 31 is pivoted to the stud 25 and a coiled spring 32, fitting at one end 33 into the stud 25, is fastened to the link 31 as at 34 (see Fig. 4). Normally the link 31 will rest as shown in Fig. 2 without much or any tension on the spring 32 against the portion 28. However, when it is desired to move the blade 26 toward the tire (see Fig. 3) the link 31 is moved back so that a plunger 35, carried by the link and controlled by a knob 36 and a spring 37, will engage behind a handle 38 of the holder 24. The link's movement, of approximately 120°, will put a tension on the spring 32 and rotate the link about the stud 25 until the blade 27 comes in contact with the tire, the blade then riding at this point with a yieldable pressure.

The trimmers may be adjusted for various width drums by moving them along the bar 13 and locking them in place by a set screw 39. The bar itself may be moved away or toward the drum by moving the shaft 15 in the bracket 16.

The operation of the trimmers is as follow. The tire carcass 10 is first constructed on the building drum 11 and the tire tread 12, made either separate or integral with sidewall strips, is stitched into place on the carcass. The bar 13 is brought down from the inoperative position 21 to a position in front of the drum as shown in Figs. 1 and 2. The operator then locks the links 31 in back of the handles 38 with the plungers 35 as shown in Fig. 3 and rotates the drum. As the drum rotates the blades 27 will gradually cut or force their way through the rubber stock at the predetermined point at which the blades were set. The pressure caused by the springs 32 is not great enough to cause the blades to cut through more than just the rubber stock. When the blades have performed their function, the operator lifts up on the knobs 36 which allows the springs 29 to draw the holders 24 back against the flanges 30. The cut off strips of rubber 40 are then pulled off the tire by the operator.

During the time the blades are cutting their way through the rubber the machine operator is free to gather his material for the next tire.

Having thus described my invention, I claim:

1. In a machine of the character described, a trimming unit adapted to be positioned adjacent a tire building drum, said unit comprising a blade, a holder for carrying the blade, a stud adapted to act as a pivot for the holder, and a spring controlled member also carried by the stud adapted to be locked behind the holder to thereby force the said blade into yielding contact with the tire.

2. In a tire building machine, a device for trimming surplus rubber stock from tire casings comprising a bracket mounted adjacent a tire building drum, a stud adjustably fixed to the bracket, a blade adapted, when pressed into contact with the rubber stock on a tire casing on the building drum, to gradually cut its way through the rubber stock, a blade holder pivoted on the stud and normally holding the blade from contact with the tire casing and a spring pressed member also carried by the said stud to hold the blade in yielding contact with the tire when the said spring pressed member is locked behind the blade holder.

3. In a tire building machine, a pair of devices for trimming surplus rubber stock from tire casings each comprising a bracket mounted adjacent one side of a tire building drum, a stud adjustably fixed to each bracket, a pair of blades adapted, when pressed into contact with the rubber stock on a tire casing on the building drum, to gradually cut their way through the rubber stock, blade holders pivoted on the studs and normally holding the blades from contact with the tire casing and spring pressed members also carried by the studs to hold the blades in yielding contact with the tire when the said spring pressed members are locked behind the blade holders, each device adjusted and operable independent of the other.

CHARLES EDGAR MAYNARD.